United States Patent [19]

Scoular et al.

[11] Patent Number: 5,422,150
[45] Date of Patent: Jun. 6, 1995

[54] SUBSTRATE CLAD WITH FIBER-REINFORCED POLYMER COMPOSITE

[75] Inventors: Robert P. Scoular, Medina; Bernard E. Nowak, Westlake, both of Ohio

[73] Assignee: HyComp, Inc., Cleveland, Ohio

[21] Appl. No.: 172,479

[22] Filed: Dec. 23, 1993

[51] Int. Cl.6 .................................................. B32B 7/00
[52] U.S. Cl. ........................................ 428/33; 428/141; 428/157; 428/332; 428/408; 428/418; 428/420
[58] Field of Search ................ 428/33, 141, 157, 332, 428/408, 418, 420

[56] References Cited

U.S. PATENT DOCUMENTS

| | | |
|---|---|---|
| 4,543,295 | 9/1985 | St. Clair et al. |
| 4,560,607 | 12/1985 | Sumner ........................... 428/141 |
| 4,822,272 | 4/1989 | Yanase et al. |
| 4,859,530 | 8/1989 | Roark et al. |
| 4,861,650 | 8/1989 | Dahms |
| 5,126,085 | 6/1992 | Thorp et al. |

OTHER PUBLICATIONS

Bernie Nowak et al., "Switching to Composites: New Thinking Required," *Materials Engineering*, (Feb., 1989).
"Composites," vol. 1, *Engineered Materials Handbook*, ASM International.
Advertisement: "New Polybon TM L," Tribon Bearing Co.
Technical Data Sheet: HyComp "WEARCLAD Self-Lubricating Wear Products" (Mar., 1993).

*Primary Examiner*—Patrick J. Ryan
*Assistant Examiner*—Richard P. Weisberger
*Attorney, Agent, or Firm*—D. Peter Hochberg; Mark Kusner; Michael Jaffe

[57] ABSTRACT

A product having a wear-resistant surface wherein the product includes a substrate with cavity means in communication with a surface of the substrate wherein the cavity means has at least one wall having a length of at least ¼". A fiber-reinforced polymer composite having at least some fibers between ½" and 2" in length forms a wear-resistant cladding over the surface of the substrate and fills the cavity means to mechanically anchor the cladding to the substrate.

29 Claims, 2 Drawing Sheets

SUBSTRATE CLAD WITH FIBER-REINFORCED POLYMER COMPOSITE

FIELD OF THE INVENTION

The present invention relates generally to a product comprised of a substrate clad with a fiber-reinforced polymer for use in high temperature and high-impact applications, and more particularly, to a component in which the substrate has at least one cavity specifically dimensioned to form a mechanical anchoring site for a polymer composite reinforced with ½" to 2" long fibers.

BACKGROUND OF THE INVENTION

There are many industrial situations in which metal coils, web and other metal products or components impact on one or more wear surfaces. The wear surfaces are exposed to impact and shear forces exerted by the products or components with which they come into contact and the more durable the surface, the longer its life and the greater its economy. In heavy industrial applications wear surfaces are typically made from metal because of its strength. Most metals, however, have relatively high coefficients of friction, so softer metals with lower coefficients of friction, such as bronze, are often used so that the products or components can slide freely over the surfaces. An example of where metal wear surfaces are used is metal coiling operations in steel and aluminum mills.

Coiled metal is produced in aluminum or steel mills by compressing the metal billets between compression rollers until the desired thickness is achieved. Afterwards, the finished sheet is coiled around a mandrel. During the process the mandrel must open and collapse, thereby increasing and decreasing its diameter, to uniformly coil the metal sheet. Internal components, normally brass wedges, within the mandrel slide between the metal walls of the mandrel causing it to open and slide out causing the mandrel to collapse. Because of the weight of the metal and the forces exerted during compression and coiling, the wedges inside the mandrel and the wear surfaces over which the metal coil slides must be impact and shear resistant to withstand the forces exerted on them. Additionally, they must have a low coefficient of friction to facilitate the sliding of one part over another.

Historically, the wear surfaces and wedges used in the applications mentioned above have been produced of brass or bronze because of their strength and relative lubricity. Despite their lubricity the brass or bronze components still require additional lubrication which is accomplished by applying grease to the wear surfaces and internal wedges. Grease applied to the internal wedges is often centrifuged away because of the high rotational speeds of the mandrels. Furthermore, water or rust inhibitor is sometimes sprayed onto the metal coil or mill components while the mill is operating, which washes away some of the grease on the wear surfaces. Operators, therefore, are constantly applying grease to the bronze components which takes time and increases the manufacturing costs.

The relative lubricity and low coefficient of friction of brass or bronze is due mainly to the softness of the metals but, because of their softness, brass and bronze components wear out relatively quickly. This creates considerable expense because of the price of new components and the downtime required to replace them.

An alternative material to brass and bronze in these applications is polymer composite comprised of a polymer resin reinforced with carbon (graphite), glass or quartz fibers. Most fiber-reinforced polymer molding compounds have fibers with a length of ¼" to 1". These composites are stronger than brass or bronze and they wear and last longer than brass or bronze in the aforementioned applications. Furthermore, the polymer resins in the composite are self-lubricating and have low coefficients of friction. Therefore, surfaces comprised of these composites do not have to be greased; however, the material cost of these composites is much higher than brass or bronze. Therefore, despite its superior performance and longer life, the overall higher cost to a manufacturing operation of components made from these composites renders their use prohibitive.

In order to take advantage of the superior characteristics of the abovementioned polymer composites, and to make a cost effective part, attempts were made to bond the composites to a metal substrate in order to reduce the amount of expensive composite material in each component, thereby reducing the cost of the component. The metal substrate used in these components was usually steel and a coating of approximately ¼" to ½" of polymer composite was applied over the steel. The resulting components still proved to be expensive and impractical, primarily because the polymer composites did not bond well to the metal. Three methods of attachment were tried, chemical bonding, adhesive bonding and mechanical attachment. All three failed when the components were placed in the production environment.

If the polymer composite was to be chemically bonded to the metal; all oils and pickling compounds first had to be thoroughly removed from the metal's surface which required that the metal be cleaned with a solvent and dried. Then the polymer composite, usually supplied in the form of a sheet molding compound (SMC), was molded or otherwise formed over a surface of the substrate. Even when the metal was thoroughly cleaned, however, the chemical bonds which form between polymers and metals are weak and cannot withstand the high impact and shear forces in metal coiling and rolling applications.

To enhance the strength of the composite-to-metal substrate bond, adhesives were applied between the metal substrate and the composite. These adhesives often consisted of a prepreg polyimide composite having a polyimide resin as the adhesive and being reinforced with continuous glass or carbon fibers where the fibers comprise approximately 70–80% of the composite by weight. At the high temperatures (400° F.–600° F.) to which the finished parts were exposed, the adhesives proved to be ineffective. Metals and composites have far different rates of thermal expansion, composites's being slight relative to metals and the adhesive was not strong enough to withstand the expansion forces. Therefore, both chemical bonds and adhesive bonds proved to be ineffective at these temperatures, especially when the component was exposed to the stress and impact forces of the coiling operation. Under such conditions, the cladding composite material would simply pull away from the metal substrate.

Attempts made to mechanically attach the polymer to the metal substrate also proved unsuccessful. Mechanical attachment usually involved machining the surface of the metal substrate to create physical bonding sites, normally in the form of grooves. The polymer composite was then molded over the substrate and during the molding process some of the composite material would flow into and fill the grooves to form mechanical anchors for the cladding. This method also proved to be ineffective, partially because of the relatively short length of the fibers contained in the composites. The anchor is only as strong as the material of which it is formed and the tensile strength of the fibers within a composite material is much greater than that of the polymer. If the fibers are not long enough to extend from the clad surface into the groove and mechanically interlock with the wall of the groove, only the polymer forms an anchor for the composite. Because the tensile strength of the polymer is far less than that of the reinforcing fiber, the anchor formed by the polymer alone is not very strong and the cladding will still pull away from the metal substrate during use.

Recently, a new family of polymer composites was developed, the HyComp 300 ™ series, having PMR-15 polyimide resin and $\frac{1}{2}''$ to 2" fibers, and which is disclosed in U.S. Pat. No. 5,126,085. This product is unique in that it is a polyimide sheet molding compound (SMC) containing $\frac{1}{2}''$ to 2" long fibers rather than $\frac{1}{4}''$ to 1" fibers or continuous fibers which had been used in the prior art composites. Furthermore, the polyimide resin has a flow viscosity of $10^2$–$10^5$ centipoise at its melting temperature of 520° F. prior to cross-linking. This viscosity is high enough so that when the resin flows it carries the fibers with it and, the viscosity is low enough so the resin carrying the fibers can flow easily into relatively small grooves and can conform to intricately shaped substrates during the molding process.

After molding and cross-linking, HyComp 300 ™ has a number of advantages as compared with other polymer composites. The longer, $\frac{1}{2}''$ to 2", fibers greatly increased the tensile strength of the material as compared to standard polyimide composites using shorter fibers. Whereas the tensile strength of standard polyimide composites is 10,000–15,000 psi, the tensile strength of HyComp 300 ™ composite is approximately 50,000–60,000 psi. When cross-linked and formed into a finished product, HyComp 300 ™ composite exhibits low friction, high wear resistance, low creep and good dimensional stability.

Because of these characteristics, HyComp 300 ™ composite had a longer life than short-fiber composites in metal coiling and rolling applications. Despite its longer life, however, HyComp 300 ™ composite still had a relatively high material cost and proved to be more expensive overall than brass or bronze when an entire component was produced from the composite material. Applicants then sought to develop a product comprised of a substrate material clad with the new HyComp 300 ™ composite. Applicants have discovered that specifically-configured discontinuity(ies) formed into the surface of a substrate, coupled with the use of polymer composites having $\frac{1}{2}''$ to 2" long fibers, create a component in which the cladding is firmly anchored onto the substrate and which is suitable for use in high stress, high temperature applications.

BRIEF DESCRIPTION OF THE INVENTION

As discussed above, composites with chopped fibers of less than $\frac{1}{2}''$ in length do not exhibit the great tensile strength or modulus of HyComp 300 ™ composite. The short fibers also do not form as strong a mechanical interlock with channels formed in the substrate as longer ($\frac{1}{2}''$ to 2") fibers. These and other problems are overcome by the invention which is basically a substrate material, preferably made of machine steel, clad with a polymer composite containing at least some fibers between $\frac{1}{2}''$ to 2" in length. The substrate has at least one anchoring site or cavity means in its surface in the form of an indentation, cavity, channel or groove, which cooperates with the polymer composite to anchor the cladding to the substrate. During the molding process, the polymer composite flows into the anchoring site as it forms a cladding over the surface of the substrate. The $\frac{1}{2}''$ to 2" fibers extend from the clad surface into the cavity means to form a mechanical interlock with the wall or walls of the cavity means. Applicants have found that cavity means having at least one wall having a length of at least $\frac{1}{4}''$ coupled with a composite having a fiber length of $\frac{1}{2}''$ to 2" yields the best results.

In accordance with the present invention, there is provided an impact and wear-resistant product comprised of a substrate clad with a fiber-reinforced polymer wherein the substrate contains cavity means for mechanically anchoring the composite to the substrate.

It is an object of the present invention to provide a product or component which is comprised of a fiber-reinforced polymer clad over a substrate.

Another object of the present invention is to attach the composite cladding to the substrate by anchoring the cladding within cavity means formed in a surface of the substrate.

Another object of the present invention is to provide a component having a fiber-reinforced polymer cladding wherein at least some of the fibers are between $\frac{1}{2}''$ and 2" in length.

Another object of the present invention is to provide a component having a fiber-reinforced polymer cladding wherein the polymer is a polyimide.

Another object of the present invention is to provide a component wherein the substrate is steel.

Another object of the present invention is to provide a component wherein the cavity means has at least one wall which forms a 90° angle or greater with an exterior surface of the substrate adjacent the wall.

Another object of the present invention is to provide a substrate wherein the cavity means has at least one wall having a length of at least $\frac{1}{4}''$.

Another object of the present invention is to provide a component having a polymer composite cladding having carbon fibers.

Another object of the present invention is to provide a polymer composite cladding which contains 42–60% by weight of fibers.

Another object of the present invention is to provide a component having a polymer composite cladding having a polymer resin with a molecular weight of 1,400 to 1,600.

Another object of the present invention is to provide a component having a polymer composite cladding having a polymer resin with a melt viscosity of $10^2$ to $10^5$ poise before cross-linking.

Another object of the present invention to provide a component for use in metal rolling and coiling operations which is wear resistant, impact resistant and self-lubricating.

A general object is to provide a product having a substrate and a strong, impact-resistant, self-lubricating cladding which is economical to manufacture, effective to use, and efficient in its operation.

These and other objects and advantages will become apparent from the following description of a preferred embodiment of the invention taken together with the accompanying drawings.

BRIEF DESCRIPTION OF THE DRAWINGS

The invention may take form in certain part and arrangement of parts, a preferred embodiment of which will be described in detail in the specification and illustrated in the accompanying drawings wherein.

DETAILED DESCRIPTION OF PREFERRED EMBODIMENT

Figure 1:
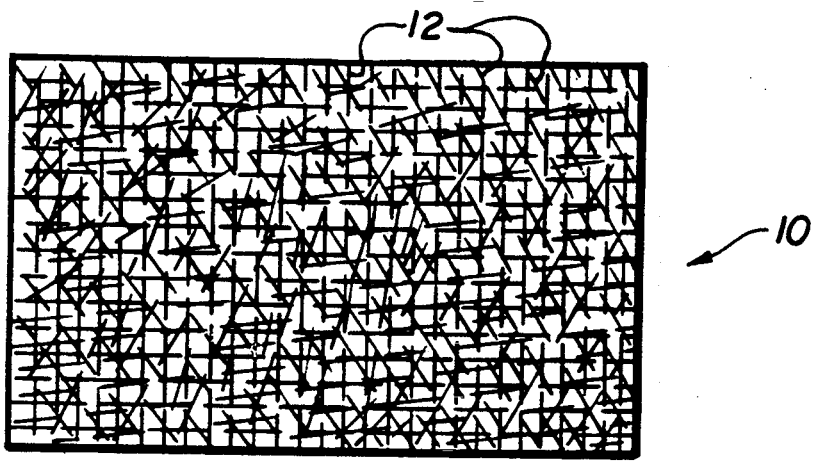
FIG. 1 is a top view of a molded polymer composite containing chopped fibers.

The composition of the polymer composite is not critical to the teaching of the invention as long as the composite contains some $\frac{1}{4}''$ to $2''$ long fibers. In this respect, any polymer-based molding compound, whether it is a bulk or sheet molding compound, can be used in the invention. The polymer, or resin base might be vinyl, polyester, vinyl-ester, phenolic, epoxy, polyimide or another polymer suitable for molding to a substrate. If desired, any of various fillers such as calcium carbonate, aluminum trihydrate, carbon spheres and others can be added to the composite.

Furthermore, the polymer composite may contain any of a variety of reinforcing fibers. For example, glass, carbon, ceramic or other reinforcing materials may be used. Fibers used for reinforcing purposes will desirably be from about $\frac{1}{4}''$ to $2''$ in length and, in a preferred embodiment of the invention, will comprise 42% to 60% by weight of the polymer composite. Applicants have found that this combination of fiber length and percentage of composite-by-weight yields the superior composite properties discussed previously and the $\frac{1}{4}''$ to $2''$ fibers form the optimal mechanical interlock with cavities or grooves formed in the substrate, as will be discussed fully below. As it will be appreciated, the fibers in the composite can be of random lengths, all that is necessary for the invention to work in most applications is that some of the fibers are between $\frac{1}{4}''$ and $2''$ in length.

The polymer composite must be capable of flowing into the anchoring cavities on the substrate during the molding process in order to firmly anchor the polymer composite cladding onto the substrate. In this respect, a polymer composite according to a preferred embodiment will have a melt viscosity of between $10^2$ poise and $10^5$ poise prior to cross-linking.

Although the present invention is not limited to a specific polymer composite, the preferred polymer composite useful as a cladding in the invention is HyComp 300 ™ polymer. This composite material is supplied as a sheet molding compound (SMC) comprised of a polyimide polymer containing 42% to 60% $1''$ carbon fibers by weight. The polyimide has a molecular weight of from about 1,400 to 1,600, a melt viscosity of $10^2$ to $10^5$ poise, and the composite has a tensile strength from about 60,000 to 70,000 psi. The melt viscosity is extremely important because, as previously mentioned, during the molding stage when the polymer composite is clad over the substrate, all of the components, i.e. the polyimide resin, the reinforcing fibers and, if present, the particulate fillers, must move or flow in concert to fill every portion of the substrate's cavities. If the melt viscosity of the resin is too low, the resin will flow by itself, leaving the fiber and fillers behind and the fibers will not flow into the cavities to create a mechanical interlock. If the melt viscosity of the resin is too high, the composite material will not flow around more intricately shaped substrates or into the anchoring cavities, and the cladding will not be firmly anchored onto the substrate. HyComp 300 ™ composite displays a useful life, in an air environment of over 2,000 hours at temperatures in excess of 550° F., and up to 1,000 hours at 600° F. These properties make it exceptionally suited for high-impact, high-shear applications at elevated environments such as those found in metal rolling and coiling mills.

The composition of the substrate material is not critical to the teachings of the invention. The substrate must be capable of withstanding the temperature and pressure of the molding process and be suitable for the application to which the finished, clad product or component will be used. In the preferred embodiment, the substrate is machine-grade steel. Steel is particularly suitable for applications in metal coiling and rolling mills.

The anchoring grooves or cavities in the substrate are dimensioned to optimize the mechanical interlocking qualities of the longer, i.e. $\frac{1}{4}''$ to $2''$, fibers which are contained within the polymer composite material. When the composite is formed over the substrate, it clads a surface of the substrate and fills the cavities. Some of the fibers extend from the cladding into the cavity and form a mechanical interlock with the walls of the cavity thereby anchoring the cladding to the substrate. To form an adequate anchoring site, the channel or cavity in the preferred embodiment should have at least one wall $\frac{1}{4}''$ in length as measured from the surface of the substrate adjacent the wall, along the wall, to the base of the cavity. Additionally, each cavity or channel must have at least one wall which forms at least a 90° angle with the substrate surface adjacent the wall. As will be appreciated, a single wall may be both at least $\frac{1}{4}''$ deep and be formed at a 90° angle or greater with the substrate surface and still fall within the scope of the present invention. A substrate may have only one cavity or a plurality of cavities. Additionally, each cavity may have only one wall, e.g. if the cavity is formed as a groove along one side of the substrate, or a plurality of walls.

Referring now to the drawings wherein the showings are for the purpose of illustrating a preferred embodiment of the invention and not for the purpose of limiting same, FIG. 1 shows a top view of a polymer composite 10 made in accordance with the teachings of the present invention. The polymer is reinforced with chopped fibers 12 at least some of which are between ½" and 2" in length. Fibers 12 may be of random lengths or may be of the same length. The polymer composite 10 is preferably comprised of polyimide resin and fibers 12 are preferably carbon.

Figure 2:
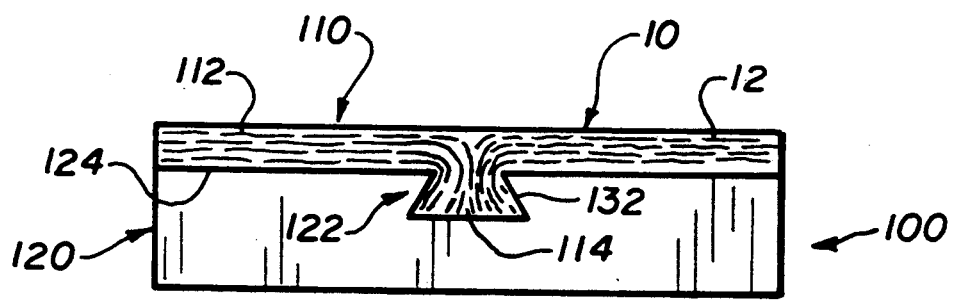
FIG. 2 is a side view of a polymer composite clad over a substrate wherein the cladding is anchored into a dovetail groove, illustrating a preferred embodiment of the present invention.

Turning now to FIG. 2, a component 100 in accordance with the teachings of the invention is shown. Polymer composite 10 has been molded over substrate 120 to form a cladding 110 having wear surface 112. In the preferred embodiment, the HyComp 300 TM polymer composite discussed above is used and a cladding thickness of ¼" to ½" is applied over the substrate. The thickness of cladding 110 as measured from wear surface 112 to clad surface 124 will vary depending upon the sheet molding compound or bulk molding compound used and the thickness desired by the manufacturer. During the molding process composite 10 flows into dovetail cavity 122 which is formed in clad surface 124 of substrate 120. In this manner, composite 10 forms anchor block 114 in cavity 122.

Cavity 122 is shaped like a "dove tail," having two inner walls 132 which are at least ¼" long, and preferably ¼" to ½", and which form a greater than 90° angle with, and thus creating undercuts in, the adjacent clad surface 124. As can be seen, the fibers 12 in composite 10 extend from cladding 110 into anchor block 114 contained within cavity 122. The fibers 12 form a mechanical interlock with cavity walls 132 and anchor cladding 110 onto substrate 120.

Figure 3:
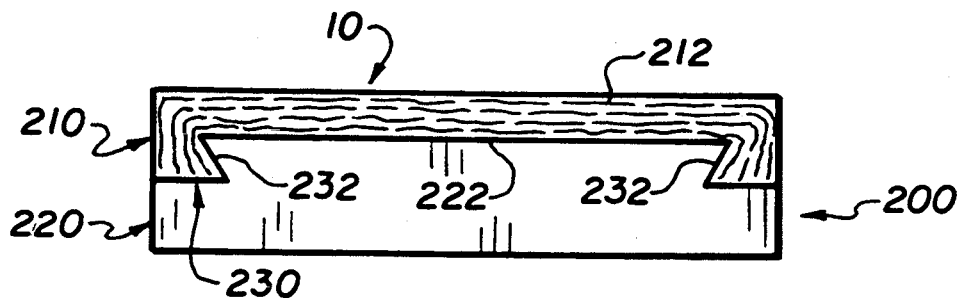
FIG. 3 is a side view of a polymer composite clad over a substrate wherein the cladding is anchored in undercuts along the edges, illustrating another preferred embodiment of the present invention.

Another preferred embodiment of the invention is represented in FIG. 3 which shows a component 200 wherein polymer composite 10 has been molded over a substrate 220 to create a cladding 210 having an upper wear surface 212. Substrate 220 has a clad surface 222 and two cavities 230 which are undercuts located on opposite longitudinal sides of substrate 220. Each cavity 230 has a single wall 232 which is at least ¼", and is preferably ¼" to ½", in length and forms a greater than 90° angle with adjacent substrate clad surface 222. During the molding process, the polymer composite 10 is formed onto substrate 220 and flows into cavity 230 to create anchor blocks 214. Fibers 12 extend from cladding 210 into anchor blocks 214 along wall 232 thus forming mechanical interlocks with walls 232 and anchoring cladding 210 onto substrate 220.

Figure 4:
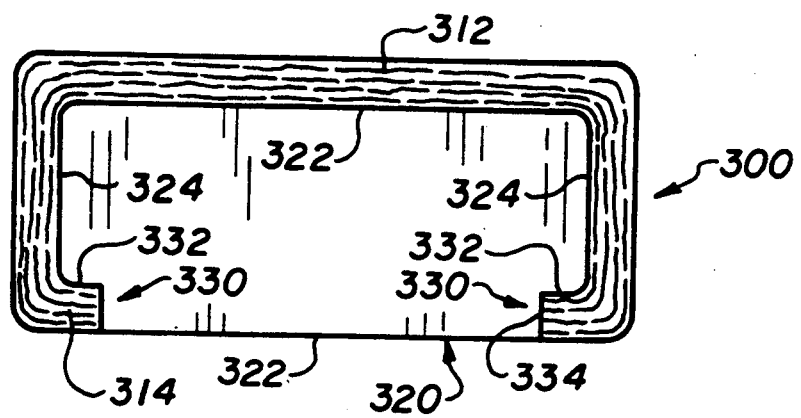
FIG. 4 is a side view of a polymer composite clad over a substrate whereby the cladding covers three faces and is anchored to grooves cut in the fourth face, illustrating another preferred embodiment of the present invention.

FIG. 4 shows a component 300 wherein polymer composite 10 has been molded over three surfaces of substrate 320 to form cladding 310. Unclad surface 322 of substrate 320 has cavities 330 which are grooves formed at either end of surface 322. Each cavity 330 has a wall 332 and a base 334 wherein wall 332 forms at least a 90° angle with adjacent clad surface 324 and the distance from adjacent wall 324 to base 334 measured along wall 332 is at least ¼" and is preferably ¼" to ½". During the molding process polymer composite 10 flows into cavity means 330 to form anchor blocks 314. Fibers 12 extend from cladding 310 into cavity 330 along walls 332 to form a mechanical interlock with walls 332 thus anchoring cladding 310 to substrate 320.

Figure 5:
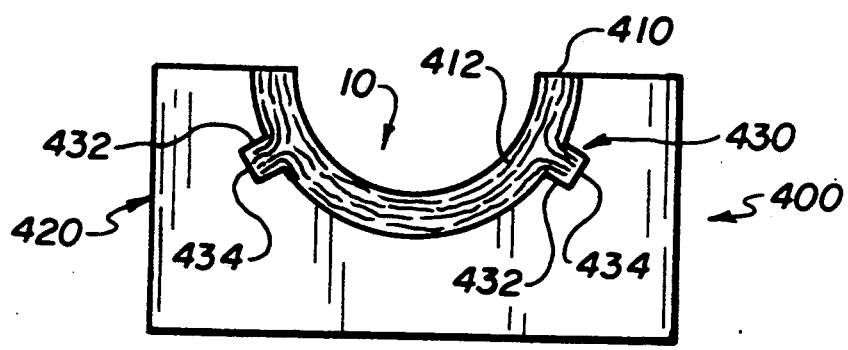
FIG. 5 is an end view of a pillow-block bearing wherein the wear surface is clad with polymer composite and the cladding is anchored in keyway grooves, illustrating another preferred embodiment of the present invention.

FIG. 5 shows a pillow-block bearing 400 wherein the substrate 420 has bearing surface 422 and two cavities 430 formed into bearing surface 422. Each cavity 430 has walls 432 and base 434. At least one wall 432 in each cavity 430 is formed at a 90° angle or greater with a portion of bearing surface 422 adjacent walls 432. The distance from bearing surface 422 adjacent cavity 430 to base 434 as measured along wall 432 is at least ¼" and is preferably ¼" to ½". During the molding process polymer composite 10 flows into cavity 430 to form anchor blocks 414. Fibers 12 extend from cladding 410 into cavity means 430 along walls 432 to form a mechanical interlock with walls 432 thus anchoring cladding 410 to substrate 420.

Figure 6:
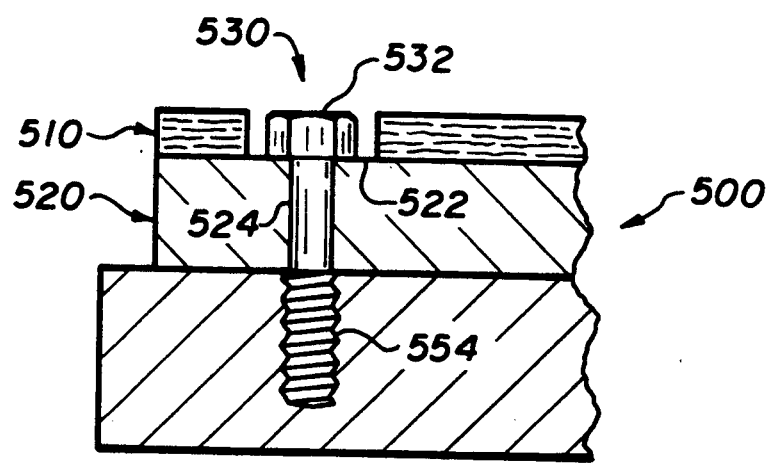
FIG. 6 is a side, cross-sectional view of a component made in accordance with the teachings of the invention wherein the component is mechanically fastened to a supporting structure.

FIG. 6 illustrates how a component 500 made in accordance with the teachings of the present invention is attached to a structure. The polymer composite cladding 510 is cut away exposing the clad surface 522 of substrate 520. An aperture 524 is then drilled or otherwise formed into substrate 520 and aligned with a threshold aperture 554 formed in structure 550. Bolt 530 is then placed through aperture 524 and threaded into aperture 554 until bolt head 532 tightens against clad surface 522.

Modifications and alterations to the products heretofore described will occur to others upon a reading and understanding of the present invention. For example, the thickness of the cladding may be varied or a polymer resin other than polyimide may be used. It is intended that any and all such modifications and alterations to the present invention be included insofar as they come within the scope of the patent as claimed or the equivalents thereof.

Having described the invention, the following is claimed:

1. A product having a wear-resistant surface, said product comprising:
   a substrate with cavity means in communication with the exterior of said substrate and an outer surface adjacent said cavity means, said cavity means having at least one interior wall extending at least ¼" from said outer surface into said substrate; and
   a fiber-reinforced polymer composite having fibers wherein at least some of said fibers are between ½" and 2" in length, said composite forming a cladding on a surface of said substrate and disposed in said cavity means to mechanically anchor said cladding to said cavity means, to prevent separation of said substrate from the composite.

2. A product as described in claim 1 wherein said cavity means has at least one wall which forms at least a 90° angle with a portion of said surface adjacent said cavity means.

3. A product as defined in claim 1 wherein said fiber-reinforced polymer composite is a sheet molding compound (SMC).

4. A product as defined in claim 1 wherein said substrate is steel.

5. A product as defined in claim 1 wherein said polymer is polyimide.

6. A product as defined in claim 5 wherein said polyimide has a molecular weight from about 1,400 to about 1,600.

7. A product as defined in claim 5 wherein said polyimide has a melt viscosity of from about $10^2$ poise to about $10^5$ poise before cross-linking.

8. A product as defined in claim 1 wherein said fibers are carbon fibers.

9. A product as defined in claim 1 wherein said cavity means is a groove cut into one side of the substrate.

10. A product as defined in claim 1 wherein at least some of said fibers are between 1" and 2" in length.

11. A product as defined in claim 1 wherein said composite contains 42–60% by weight of fibers.

12. A product having a wear-resistant surface, said product comprising:
a substrate with cavity means in communication with the exterior of said substrate and an outer surface adjacent said cavity means, said cavity means having at least one interior wall which extends at least ¼" from said outer surface into said substrate, and
a fiber-reinforced polymer composite comprised of a polyimide polymer having 42–60% by weight of fibers wherein at least some of said fibers are between ½" and 2" in length, said composite forming a cladding on a surface of said substrate and disposed in filling said cavity means to mechanically anchor said cladding to said cavity means.

13. A product as defined in claim 12 wherein said cavity has at least one wall which forms at least a 90° angle with said outer surface of said substrate adjacent said wall.

14. A product as defined in claim 12 wherein said reinforcing fibers are carbon.

15. A product as defined in claim 12 wherein said polyimide has a molecular weight between 1,400 and 1,600, and a melt viscosity of from about $10^2$ poise to about $10^5$ poise before cross-linking.

16. A product as defined in claim 12 wherein at least some of said fibers are between 1" and 2" in length.

17. A product having a wear-resistant surface, said product comprising:
a substrate with cavity means in communication with a surface thereof, said cavity means having at least one depth wall which extends at least ¼" into said substrate as measured along said depth wall from an outer surface of said substrate adjacent said depth wall, said cavity means having at least one angled wall which forms at least a 90° angle with an outer surface of said substrate adjacent said angle wall; and,
a composite material comprised of a polyimide polymer having 42%–60% by weight of fibers, said polyimide having a melt-flow viscosity of $10^2$–$10^5$ poise prior to cross linking and a molecular weight of between 1,400 and 1,600, at least some of said fibers being between ½" and 2" in length, said composite material forming a cladding on a surface of said substrate and filling said cavity means to mechanically anchor said cladding to said cavity.

18. A product as defined in claim 17 wherein at least some of said fibers are between 1" and 2" in length.

19. A product as defined in claim 17 wherein said depth wall and said angled wall are the same wall.

20. A product having a wear-resistant surface according to claim 1, wherein said polymer composite is a thermoset material.

21. A product having a wear-resistant surface according to claim 1, wherein the cavity means of said substrate and the portion of said composite disposed in the cavity means form an interlocking joint to prevent the separation of said substrate and said composite.

22. A product having a wear-resistant surface according to claim 21 wherein said interlocking joint is a dovetail joint.

23. A product having a wear-resistant surface according to claim 12, wherein said cavity means and the portion of said composite disposed in said cavity means form an interlocking joint for preventing separation of said substrate and said composite.

24. A product having a wear-resistant surface according to claim 23 wherein said interlocking joint is a dovetail joint.

25. A product having a wear-resistant surface according to claim 17, wherein said cavity means and the portion of said composite disposed in said cavity means form an interlocking joint for preventing separation of said substrate and said composite.

26. A product having a wear-resistant surface according to claim 25 wherein said interlocking joint is a dovetail joint.

27. A product having a wear-resistant surface according to claim 1, wherein said substrate is metal.

28. A product having a wear-resistant surface according to claim 12, wherein said sustrate is metal.

29. A product having a wear-resistant surface according to claim 17, wherein said substrate is metal.

* * * * *